June 11, 1935.  H. J. DILLON  2,004,749
VEHICLE
Filed Oct. 23, 1933   2 Sheets-Sheet 1
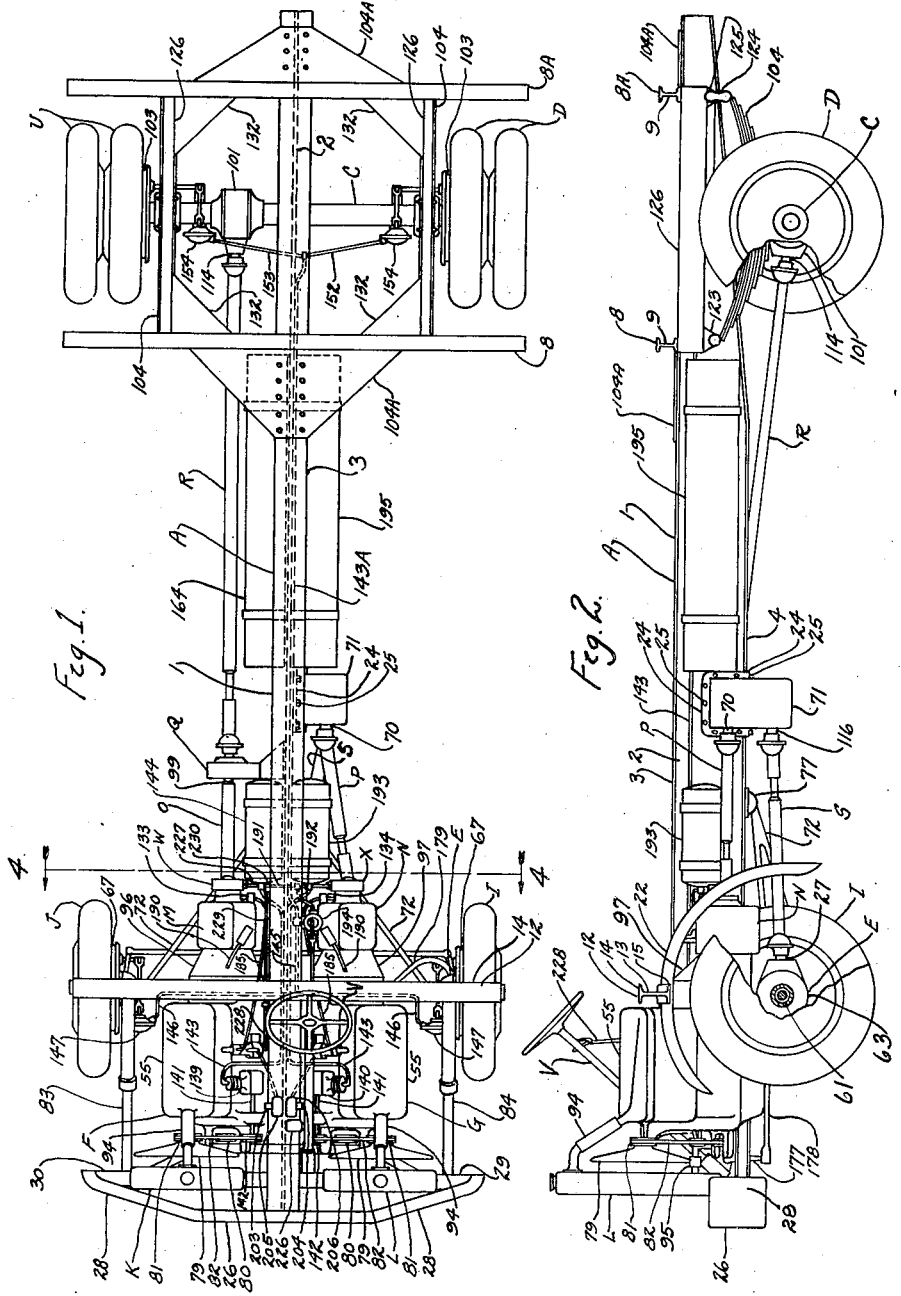
INVENTOR.
Hugh Joseph Dillon
BY
George B. Ingersoll
ATTORNEY.

June 11, 1935.  H. J. DILLON  2,004,749
VEHICLE
Filed Oct. 23, 1933  2 Sheets-Sheet 2
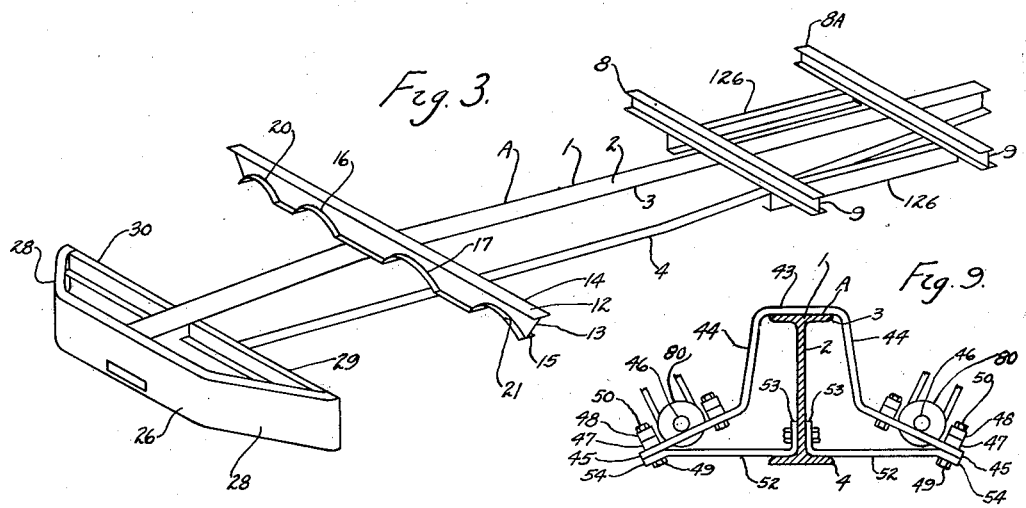
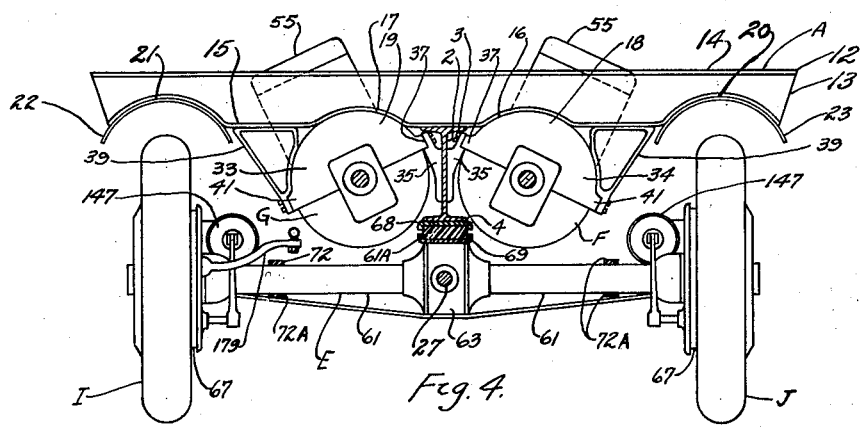
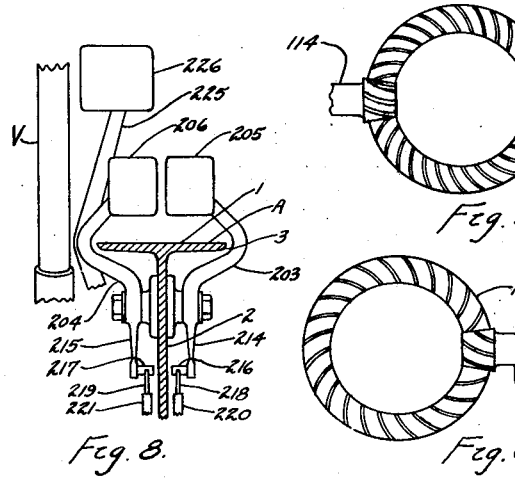
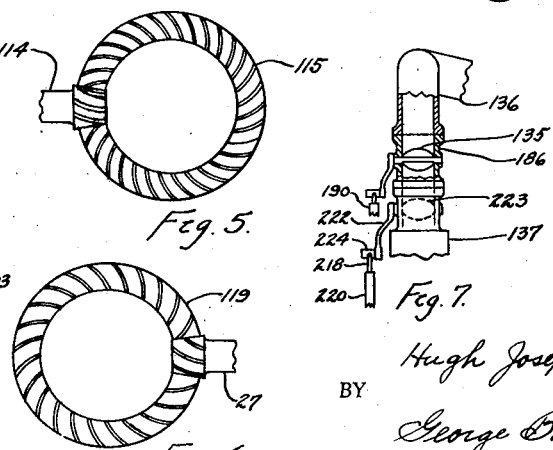
INVENTOR.
Hugh Joseph Dillon
BY
George B. Ingersoll
ATTORNEY.

Patented June 11, 1935

2,004,749

UNITED STATES PATENT OFFICE 2,004,749

VEHICLE

Hugh Joseph Dillon, Highland Park, Mich.

Application October 23, 1933, Serial No. 694,835

15 Claims. (Cl. 180—44)

My invention relates to vehicles having a front steering driving axle together with a rear driving axle; and the objects of my improvement are, first, to provide a pair of independently or separately operated engines operatively connected with a steering driving axle located at the front portion of the vehicle and with a driving axle located at the rear portion of the vehicle; second, to provide a vehicle in which a pair of independently or separately operated engines are mounted on opposite sides of a main frame member and are each operatively and respectively connected with a front steering driving axle and with a rear driving axle; third, to provide a vehicle having a front steering driving axle connected at its central portion by means of a resilient block of rubber or similar composition to a main frame member extending longitudinally at the approximate longitudinal center of the vehicle; fourth, to provide a vehicle with a pair of transmission mechanisms oppositely disposed to a single transmission mechanism relatively to a main frame member extending substantially at the longitudinal center of the vehicle; and fifth, to provide a vehicle having its axle driving mechanisms located in diagonally oppositely disposed positions relative to a main frame member extending substantially at the longitudinal center of the vehicle.

I attain these objects by mechanisms illustrated in the accompanying drawings, in which:—

Figure 1 is a plan view of the vehicle; Fig. 2, a side view of the vehicle with one of its rear wheels partially disclosed; Fig. 3, a perspective view of the frame assembly; Fig. 4, a partial sectional view of the vehicle on the line 4—4, Fig. 1; Fig. 5, a side view of the pinion and ring gear of the rear driving axle assembly; Fig. 6, a side view of the pinion and ring gear of the front driving axle assembly; Fig. 7, a partial vertical section through the intake mechanism of one of the engine assemblies; Fig. 8, a transverse sectional view of the main frame member and with the throttle control pedals or levers mounted thereon together with a portion of the pedal or lever for controlling the operation of the air brake system and a portion of the steering gear; and Fig. 9, a vertical section through the front engine supports and the main frame member.

Similar numerals refer to similar parts throughout the several views.

It is to be understood that the vehicle hereinafter to be described is provided with many units similar to those disclosed and claimed in my application of Vehicle, Serial No. 681,851, filed July 24, 1933, some of these units being namely, the engine assemblies and their accessories, transmissions, propeller shafts and their mountings, gasoline tanks, air tanks, mufflers, radiators, and the front portion of the frame assembly.

The above mentioned and similar units, which have been described in detail in the above mentioned application, will be briefly described herein with sufficient detail to disclose their operative relationship in combination with the new and novel features of the vehicle herein disclosed over the vehicle disclosed in the above mentioned application.

The vehicle is provided with the frame assembly A which is located so that the main frame member 1 extends longitudinally along the center or approximate longitudinal center of the vehicle and may be constructed of rolled channel I-beam section, as disclosed, with a main vertical web 2 and the integral flanges 3 and 4 extending transversely therefrom at the top and bottom of the frame member 1.

The frame assembly A is provided with the rear cross members 8 and 8A which may also be each provided with the vertical web 9 and may be suitably connected to the flange 3 of the frame member 1 by welding, riveting, or other suitable or similar means, the rear cross members 8 and 8A being preferably located at points slightly ahead and slightly behind the center of the rear axle assembly C. The front cross member 12 may also be provided with the vertical web 13 and the upper and lower flanges 14 and 15 extending therefrom and may be secured to the flange 3 of the frame member 1 by welding, riveting, or other suitable or similar means, the front cross member 12 being preferably located directly over the center of the front driving axle assembly E.

The lower flange 15 of the frame cross member 12 is provided with the curved, radial, spherical, or depressed surfaces 16 and 17 for receiving and engaging similar surfaces on the housings 18 and 19 of the engine assemblies F and G.

The frame cross member 12 may be further provided with the curved, radial, spherical, or depressed surfaces 20 and 21 for receiving and engaging the fenders 22 and 23 which may be suitably secured thereto.

The bumper member 26 is suitably secured to the front portion of the frame member 1 and is provided with the angularly positioned or rearwardly inclined portions 28 which may be so located as to conform with the shape or outline of the cab unit which is disclosed and claimed in my application for United States patent, Serial No. 681,850, filed July 24, 1933.

The rearwardly inclined portions 28 of the bumper 26 are connected at their rear extremities with the members 29 and 30 which extend to and are suitably connected with the frame member 1 as by welding or other suitable means.

The housings 18 and 19 of the engine assemblies F and G are provided with curved, radial, or spherical surfaces which engage and fit with the similar surfaces 16 and 17 of the frame member 1, the inner brackets 35 being further suitably secured to the inner supporting arms or portions 37 of the engine or bell housings 33 and 34.

The housings 18 and 19 of the engine assemblies F and G are further supported in the curved surfaces 16 and 17 of the front cross member 12 by the outer support brackets 39 which are suitably secured to the lower flange 15 of the front cross member 12, the outer support brackets 39 being further suitably secured to the outer supporting arms or portions 41 of the engine or bell housings 33 and 34. The engine assemblies F and G are thus located and mounted on each outer side of the main or central frame member 1 and each of said engine assemblies F and G are rendered readily removable from their mountings without lifting over the usual side rails of a conventional frame assembly in which a pair of side rails are located at the extreme outer sides of a frame assembly.

The engine assemblies F and G are further supported at their front portions by the bracket member 43, which may be constructed in one piece and straddle mounted over the main frame member 1, as disclosed in Fig. 9, the bracket member 43 being suitably secured to the flange 3, the bracket member 43 being provided with the downwardly extending portions 44 which are in turn provided with the portions 45 which may extend under the crankshaft extensions 46 of the engine assemblies F and G to support the blocks or members 47, which may be constructed of resilient material, such as rubber composition or similar material, the blocks 47 engaging the lugs 48 which may be formed integrally with or suitably attached to the forward portions of the housings of the engine assemblies F and G, the portions 45, the blocks 47 and the lugs 48 being secured together by the bolts 49 and the nuts 50, which when removed permit the front portions of the engine assemblies F and G to be readily removed from their supported positions in a similar manner as above described relative to the rear support mechanism of the engine assemblies F and G. The brackets 52 may be used to support the portions 45 of the bracket 43, the brackets 52 being provided with the flange portions 53 for suitable attachment to the web 2, the brackets 52 being further provided with the portions 54 for connecting to the portions 45 of the bracket 43 by welding or other suitable means, the bolts 49 being adapted to further extend through the portions 54.

It is to be noted that the engine assemblies F and G, by the above described mechanism, will be supported in angular positions relative to one another and to the main frame member 1, the engine assemblies F and G being herein disclosed as having their cylinder portions 55 supported approximately at an angle of thirty-five degrees from a vertical line, the angle of inclination of the engine assemblies F and G being varied to suit various engines and vehicles.

It is to be noted that the above disclosed angular positions of the engine assemblies F and G will provide sufficient room or passage therebetween to permit the operator or driver of the vehicle to enter and pass, between the engine assemblies F and G, to a driver's seat within a cab enclosure which is disclosed and claimed in the above mentioned application for United States patent Serial No. 681,850.

The front axle assembly E herein disclosed comprises a pair of tubular members 61 connected at their inner ends to the differential gear housing 63 and are operatively connected at their outer ends to the wheel assemblies I and J on which are suitably mounted the brake drums 67 with conventional brake mechanisms operatively mounted therein.

The differential gear housing 63 is connected to the lower flange 4 of the main frame member 1 by means of the resilient block or member 61A made of rubber or similar composition and suitably connected as by vulcanizing or similar means to the upper cup or housing member 68 and the lower cup or housing member 69, the member 68 being suitably secured to the flange 4 of the main frame member 1 and the member 69 being suitably secured to the upper portion of the differential gear housing 63.

It is to be understood that the resilient member 61A will be of sufficient size and strength to support the weight of the frame assembly A and its load and at the same time allow for sufficient movement of the axle assembly E as it moves to and fro in its oscillatory or pivotal movement as actuated by the torque mechanism hereinafter described and which is provided to absorb the driving torque reactions developed in the operation of the driving gear mechanism as well as the reaction developed in the thrust of the torque mechanism in propelling the vehicle.

The torque member 72 is provided with the upper and lower flange portions 72A which are suitably secured to the tubular members 61.

The torque member 72 extends diagonally and rearwardly from the axle assembly E to a point below the lower flange 4 of the main frame member 1 to which it is pivotally connected by the bracket 77 which is suitably supported on the lower flange 4. It is thus to be noted that the usual front springs which connect the front steering axle assembly to a frame assembly are eliminated by means of the resilient member 61A interposed directly under the main frame member 1 and over the differential gear housing 63 of the axle assembly E.

The radiator assemblies K and L are mounted in upright and vertical positions at each side of the main frame member 1 which is located at the center of the vehicle, and are suitably secured to the upper flanges of the members 29 and 30, the radiator assemblies K and L being located, relative to the engine assemblies F and G, so as to be positioned adjacent to and slightly ahead of the fans 79 which are suitably connected with and operatively driven by the pulleys 80 which are suitably mounted on the crankshaft extension 46, the pulleys 80 and the pulleys 81 of the fans 79 being operatively connected by the belts 82. The radiator assemblies K and L are suitably connected at their upper portions with the cylinder portions 55 by the flexible hoses 94 and at their lower portions with the lower portions of the engine assemblies F and G by the flexible hoses 95.

To further brace and support the bumper 26, the telescoping members 83 and 84 may be operatively connected and mounted between the cross member 12 and the members 29 and 30 as disclosed in said application, Serial No. 681,851.

It is to be noted that my invention comprises two separate and independent engine or motor assemblies F and G, or power plants which are not operatively connected with each other through any form of power transmitting units such as transmissions, clutches, rear axles, etc. or through any accessories such as carburetors, throttle mechanism, etc., each engine or motor assembly or power plant separately and independently driving one of the gear mechanisms in the driving axle assemblies C and E, both of said power plants being adapted, however, to be operated together, to simultaneously drive the vehicle when desired.

The engine assemblies F and G are respectively provided with the clutch housings 96 and 97 suitably supported therein and enclosing a suitable and conventional type of clutch mechanism which operatively connects the engine assemblies F and G with the transmission assemblies M and N, which are supported on the clutch housings 96 and 97.

The propeller shaft assemblies O and P are respectively operatively connected with and supported, at their front ends, on the transmission assemblies M and N, the propeller shaft assembly O being supported at its rear end on the bearing assembly Q which is suitably attached to the frame assembly A, and the inner race of which is mounted and suitably secured on the extension 99 of the propeller shaft assembly O. The propeller shaft assembly P is suitably mounted on and secured to the drive shaft 70 of the transfer or transmission assembly 71 which may be suitably mounted on and secured to the main frame member 1 by the flange portions 24 of the transmission assembly 71 and the bolts 25.

The propeller shaft assembly R is operatively connected with and suitably supported at its front end, on the extension 99, of the propeller shaft assembly O and is operatively connected with and supported, at its rear end, on the pinion shaft 114 which is suitably mounted in the driving gear housing 101 of the rear driving axle assembly C and operatively engages the ring gear 115 of said driving axle assembly C.

The propeller shaft assembly S is operatively connected with and supported, at its front end, on the pinion shaft 27 of the front driving axle assembly E and is operatively connected with and supported at its rear end, on the shaft 116 which is suitably mounted in the transmission assembly 71 and forms the drive shaft for the propeller shaft assembly S, the pinion shaft 27 being suitably mounted in the front driving axle assembly E and operatively engaging the ring gear 119.

The ring gears 115 and 119 are suitably and respectively mounted in the driving axle assemblies C and E and are respectively and operatively connected with conventional differential mechanism for transmitting driving torque to the wheel assemblies I and J of the front driving axle assembly E and the wheel assemblies U and D of the rear driving axle assembly C, the wheel assemblies U and D being provided with the brake drums 103.

The driving axle assembly C is suitably connected with the rear springs 104 each of which is pivotally connected with the bracket 123, at its front end, and to the shackle 124, at its rear end, said shackle 124 being pivotally connected with the bracket 125, the brackets 123 and 125 being suitably connected to the frame members 126 which extend between and are suitably and respectively connected with the frame cross members 8 and 8A.

The gusset members 104A may be suitably connected to the frame member 1 and the frame cross members 8 and 8A at the intersections thereof.

The rear frame cross members 8 and 8A may be braced by the gusset members 132 which may be secured at their outer ends to the rear frame members 126 and at their inner ends to the frame cross members 8 and 8A, the frame cross members 8 and 8A being reinforced by the frame members 126 extending longitudinally relative to and adjacent the springs 104.

The frame construction above described is disclosed in and forms a portion of the specification, Serial No. 681,851, filed on July 24th, A. D. 1933, by me for Vehicle.

It is to be noted that the driving pinion 114 of the rear driving axle assembly C will be provided with an identical number of teeth as the pinion gear 27 of the front driving axle assembly E and also the ring gear 115 of the rear driving axle assembly C will be provided with a greater number of teeth than the ring gear 119 of the front driving axle assembly E, this being clearly disclosed in Figs. 5 and 6. The identical number of teeth in the above mentioned pinions and the different number of teeth in the ring gears will provide a higher axle driving ratio for the axle C than will be obtained by the driving pinion 27 and the ring gear 119 which drive the front axle assembly E.

It is also to be noted that to operate the vehicle in my invention with the different rear axle ratios, as above disclosed, the engine assemblies F and G will be governed to revolve at different speeds. The road speed, however, of the rear driving axle assembly C and its driving wheel assemblies U and D and the front driving axle assembly E will be the same, each engine assembly F and G applying different torque to the front and rear driving gear mechanisms because of the different ratios in each of the driving gear mechanisms as above described.

It is to be understood that the higher and lower ratio mechanisms of the front and rear driving axle assemblies may be located as above described with the higher gear ratio mechanism operatively connected with the wheel assemblies U and D or the higher gear ratio mechanism may be operatively connected with the wheel assemblies I and J and the lower gear ratio mechanism then operatively connected with the wheel assemblies U and D. With the driving gear mechanisms as above described and disclosed in the drawings, the engine assembly F will be governed to operate at a lower speed than the engine assembly G to compensate for the difference in the gear ratio mechanisms of the driving axle assemblies C and E.

It will thus be seen that the driving power of the engine assemblies F and G will be respectively transmitted through gear mechanisms in the transmission assemblies M and N so that either one of the two engine assemblies F and G may be selectively operated to propel the vehicle through a single driving gear axle mechanism or both of the engine assemblies F and G may be operated collectively to propel the vehicle through both of the driving gear axle mechanisms of the vehicle.

Thus with my invention one engine assembly only may be used to propel the vehicle by means of one driving axle assembly when it is on level roadways, while both engine assemblies may be used together to propel the vehicle with a pair of driving axle assemblies when maximum driving power is needed because of heavy loads, bad roadways, or highway grades, etc.

It will thus be seen that my invention will provide a means of conserving fuel or gasoline, or other fuels used to operate the engines by permitting the simultaneous driving operation of both of the axle gear driving mechanisms in the pair of driving axle assemblies only when they are both needed for heavy or maximum pulling conditions.

It is to be noted that the engine assemblies F and G will be operated entirely separate from one another and will not be synchronized to operate at the same speeds as has been the custom with dual engine vehicles heretofore.

In order to further permit the engine assemblies F and G to be operated entirely independent as regards any interconnected power transmitting devices or accessory control units, the transmission assemblies M and N are each provided with an automatically operated gear shift mechanism which may be of the standard or conventional design, the power control utilizing either vacuum or air and being controlled by conventional push button control mechanism, arranged so that each of the transmission assemblies M and N can be shifted independently or separately relative to the other and yet they may be operated simultaneously.

Also if desired the automatically operated gear shifting mechanism of the transmission assemblies M and N may be of the mechanically operated type, utilizing conventional centrifugal control means for shifting the various gear members into mesh and in accordance with the predetermined speed of the vehicle, the flexible shaft control unit 190 being disclosed in Fig. 1, said flexible shaft 190 being suitably extended and mounted in a convenient operating position for the driver, the clutch mechanism in such mechanism being located if desired in the rear portions of the transmission assemblies M and N in a conventional manner.

In order to further provide for the separate control of the engine assemblies F and G, the speed control governors 133 and 134 will be suitably mounted at the rear of the transmission assemblies M and N to operate the flexible shaft mechanism 185 or similar and suitably mounted members connecting the speed control governors 133 and 134 respectively with the governing throttle 135, which may be located in the housing 186 suitably connected with intake manifolds 136 of the engine assemblies, and suitably connected between the carburetors 137 and the manifolds 136, the intake manifolds 136 being suitably located in a fore and aft direction relative to the cylinders 55 and also suitably located relative to the longitudinal center of the bores of the cylinders 55.

The flexible shafts or similarly connected mechanism thus provides a driving connection between the control governors 133 and 134, and the governing throttle valves 135, thus being controlled by the speed of the vehicle to further control the operation of the engines at the desired operating speed thus enabling one of the engine assemblies F or G to run idle if desired, while the other of the engine assemblies is still pulling at full power.

The vehicle will be equipped with two independent air brake systems in which the air compressors 139 and 140 will be respectively and operatively mounted on the engine assemblies F and G, the air compressors being suitably operated by means of the shafts 141 and the pulleys 142, the pulleys 142 being suitably driven by the belts 82. The air compressors 139 and 140 will be suitably connected by the pipes or tubing 143 with the air storage tanks 144 and 193 which are suitably supported from and at the sides of the main frame member 1, the air storage tanks 144 and 193 being further connected by the pipes 191 and 192 to the air control valve 194 which is suitably and further connected by the pipes or tubings 145 and 146 to the air diaphragms 147 which are suitably mounted on the front driving axle assembly E and by suitable linkage further operate in a conventional manner, the suitably mounted brake mechanisms enclosed in the brake drums 67.

The air control valve 194 is further suitably connected by means of the pipes or tubings 143A, 152 and 153 to the air diaphragms 154 which are suitably connected and adapted by links and shaft members to operate brake mechanisms enclosed within the brake drums 103 and of the rear axle assembly C.

It is thus to be seen that with both of the engines F and G operating simultaneously or with either one of the engines F and G in operation, brake applications may be made on all of the four wheels of the vehicle simultaneously.

The fuel tanks 164 and 195 may be suitably supported in a similar compact and protected manner from and adjacent the sides of the main frame member.

The fuel tanks 164 and 195 and the air tanks 144 and 193 will be of such size and shape as to provide operating clearance relative to the propeller shaft assemblies O, P, R and S.

The steering gear assembly V may be suitably supported from the web 2 of the main frame member 1 and may be operatively connected, by the steering drag link 178, to the steering arm 179 of the front axle assembly E, the steering drag link 178 being operatively connected to the steering gear arm 177.

The pedal or lever members 203 and 204 are respectively provided with the pads 205 and 206 which are located adjacent one another and also are preferably located in alignment in a plane extending transversely relative to longitudinal center of the vehicle to permit the foot of the operator of the vehicle to be placed in an operative position separately on either of the pads 205 or 206 or on both of the pads 205 and 206 simultaneously, thus enabling the operator to optionally accelerate or decelerate one or both of the engine assemblies F and G to control the operation of the vehicle. The pedals 203 and 204 are each mounted in a manner similar to that disclosed and claimed in my application for Vehicle, Serial No. 681,850, filed July 24, 1933.

The pedals 203 and 204 are respectively provided with the arms 214 and 215 in which are rollably mounted the members 216 and 217 to which are suitably connected the flexible shafts 218 and 219 suitably mounted in the flexible conduits 220 and 221, the flexible shafts 218 and 219 being respectively connected with the levers 222 suitably mounted in the carburetors 137 of the engine assemblies F and G, and operatively connected with the fuel throttles 223 of the carburetors 137, the lever arms 222 each being provided with the rollably mounted members 224 for operatively connecting with the flexible shafts 218 and 219.

The pedal or lever member 225, provided with the pad 226 may be pivotally mounted on the main frame member 1 in a manner similar to the pedal or lever members 203 and 204 and is operatively connected with the air control valve 194 to permit manual control of the application of the air brakes in the brake system of the vehicle.

The transmission assemblies M and N are respectively provided with the propeller shaft brake assemblies W and X which may be operatively mounted in a conventional way on the transmission assemblies M and N and will be operatively connected together by a suitably mounted shaft 227, which may extend through the main frame member 1, and be further operatively connected with the brake lever 228 by the rod 229 and by suitable lever mechanism, the hub portion of which is indicated at 230, the brake lever 228 being suitably and operatively mounted on the main frame member 1, both of the propeller brake assemblies being capable of being operated simultaneously by the brake lever 228.

It is also to be further noted that one only of the transmission assemblies M or N will be provided with a conventional free wheeling mechanism, the transmission assembly provided with said free wheeling mechanism being the one that is operatively connected with the driving gear mechanism having the lower gear ratio mechanism, the transmission assembly N thus being, in the vehicle as disclosed, the one provided with said free wheeling mechanism.

It is thus to be noted that with one only of the transmission assemblies, namely N, thus being provided with a free wheeling mechanism and with the engine assembly F being governed to a predetermined road speed, the engine assembly G will be automatically relieved, by the free wheeling mechanism, from driving the driving wheels I and J, the engine assembly G then continuing to operate at an idling speed, the engine assembly F continuing to drive the driving wheels U and D and in turn the vehicle, until the road speed falls below a predetermined amount at which time the engine assembly G will again automatically resume its driving operation of the vehicle in conjunction with the engine assembly F. It is to be noted that my invention will thus provide means for utilizing automatically one or both of the engine assemblies F and G to most economically drive the vehicle according to the load and speed requirements of the vehicle.

I claim:

1. In a vehicle, the combination of a front steering driving axle having a driving gear reduction mechanism, a rear driving axle having a driving gear reduction mechanism of different ratio than said front steering driving axle, a pair of power plants operatively connected with said driving axles, and means for controlling each of said power plants to operate simultaneously at a different rate of speed relative to the other of said power plants.

2. In a vehicle, the combination of a front steering driving axle assembly suitably mounted, a rear driving axle assembly, each of said driving axle assemblies being provided with driving gear mechanism having a different driving speed ratio than the other of said driving gear mechanisms, a pair of engine assemblies suitably mounted, one of said engine assemblies only being operatively connected with one of said driving gear mechanisms of said driving axle assemblies, and means for controlling each of said engine assemblies to operate at a different speed from the other of said engine assemblies to drive the vehicle at a predetermined rate of speed.

3. In a vehicle, the combination of a front steering and driving axle assembly suitably mounted and provided with reduction gear mechanism, a rear driving axle assembly provided with a reduction gear mechanism, one of said reduction gear mechanisms having a slower driving speed ratio than the other of said reduction gear mechanisms, a pair of engine assemblies suitably mounted and governed to operate at different rates of speed, power transmission means operatively connecting each of said engine assemblies with one only of said reduction gear mechanisms, said power transmission means comprising a transfer transmission for transmitting driving torque from one of said engine assemblies to said front steering and driving axle assembly, and free wheeling mechanism suitably mounted and forming a portion of said power transmission means operatively connecting the reduction gear mechanism having the slower driving speed ratio, with one of said engine assemblies to permit the engine assembly, operatively connected with the reduction gear mechanism having the slower driving speed ratio, to operate without exerting a driving effort, relative to said reduction gear mechanism having the slower driving speed ratio, when the vehicle has attained a predetermined road speed.

4. In a vehicle, the combination of a main frame member extending longitudinally at the substantial longitudinal center of the vehicle, a pair of engine assemblies suitably mounted on opposite sides of said main frame member and located with their front ends adjacent one another, a rear driving axle assembly provided with driving gear mechanism, a steering axle assembly provided with driving gear mechanism, power transmission means suitably mounted on and at the side of said main frame member, said power transmission means operatively connecting one of said engine assemblies with the driving gear mechanism of said rear driving axle assembly, and a second power transmission means suitably mounted on and at the opposite side of said main frame member from said first mentioned power transmission means, said second power transmission means extending rearwardly from the rear end of one of said engine assemblies only to a point intermediate between said steering axle and said rear driving axle assemblies, said second power transmission means being operatively connected with the driving gear mechanism of said steering axle assembly.

5. In a vehicle, the combination of a main frame member extending longitudinally at the substantial longitudinal center of the vehicle, a pair of engine assemblies suitably mounted on opposite sides of said main frame member, a steering axle assembly provided with a driving gear mechanism, a rear axle assembly provided with a driving gear mechanism located diagonally and on the opposite side of said main frame member relative to the driving gear mechanism of said steering axle assembly, a transmission mechanism suitably mounted on and operatively connected with each of said engine assemblies, propeller shaft means operatively connecting said transmission on one of said engine assemblies with the driving gear mechanism of said rear axle assembly, a third transmission suitably mounted on said main frame member, propeller shaft means operatively connecting said transmission on the other of said engine assemblies with said third transmission, and propeller shaft means operatively connecting said third transmission with the driving gear mechanism of said steering axle assembly.

6. In a vehicle, the combination of a steering driving axle assembly provided with a gear reduction mechanism, a second driving axle assembly provided with a reduction mechanism having a different gear ratio than said gear reduction mechanism of said steering driving axle assembly, a pair of engine assemblies, means governing said pair of engine assemblies to operate simultaneously at different rates of speed, and power transmission means operatively connecting each of said engine assemblies with one only of said gear reduction mechanisms of said axle assemblies, said power transmission means comprising a plurality of transmissions each operating at different rates of speeds to drive the vehicle at a predetermined rate of speed.

7. In a vehicle, the combination of a steering driving axle assembly provided with a gear reduction mechanism, a second driving axle assembly provided with a gear reduction mechanism, a pair of engine assemblies each operatively connected with one only of said gear reduction mechanisms of said axle assemblies, said engine assemblies being located with their front ends adjacent one another, said engine assemblies being further located with their rear ends adjacent one another, and a free wheeling assembly operatively connected with one only of said engine assemblies and one only of said axle assemblies to permit one only of said engine assemblies to drive the vehicle when both of said engine assemblies are running.

8. In a vehicle, the combination of a front driving axle assembly, a rear driving axle assembly, a pair of engine assemblies each operatively connected with one only of said axle assemblies, said engine assemblies being located with their front ends adjacent one another, said engine assemblies being further located with their rear ends adjacent one another, and a free wheeling mechanism operatively connected with one of said engine assemblies and said front driving axle assembly to permit the other of said engine assemblies to drive the vehicle through said rear driving axle assembly when the vehicle attains a predetermined rate of speed.

9. In a vehicle, the combination of a steering driving axle assembly, a second driving axle assembly, a pair of engine assemblies mounted with their front ends adjacent one another, said engine assemblies being further located with their rear ends adjacent one another, a transmission assembly operatively connected with each of said engine assemblies and extending rearwardly therefrom, means for changing the rate of speed of one of said transmissions, a second means for changing the rate of speed of the other of said transmissions relative to the rate of speed of said first mentioned transmission, means for controlling said engine assemblies to operate at different rates of speeds, and power transmission means operatively connecting each of said transmissions with one of said driving axle assemblies.

10. In a vehicle, the combination of a steering driving axle assembly provided with reduction gear mechanism, a second driving axle assembly provided with a reduction gear mechanism, one of said reduction gear mechanisms having a slower driving speed ratio than the other of said reduction gear mechanisms, a pair of engine assemblies mounted adjacent and above said steering driving axle assembly, power transmission means operatively connecting each of said engine assemblies with one only of said driving axle assemblies, and means for controlling said engine assemblies to operate at different speeds to drive the vehicle in a straight ahead direction.

11. In a vehicle, the combination of a steering driving axle assembly, a second driving axle assembly, a pair of engine assemblies each operatively connected with one of said driving axle assemblies, and means for controlling said engine assemblies to enable one only of said pair of engine assemblies to drive said second driving axle assembly to drive the vehicle, said means comprising a free wheeling unit connected between one of the pair of engine assemblies and one only of a pair of driving axle assemblies, said unit developing free wheeling operation when the vehicle is driven in a straight ahead direction.

12. In a vehicle, the combination of a frame assembly comprising a main frame member extending longitudinally at the approximate center of the vehicle, a steering axle assembly operatively connected with said frame assembly at its front portion, a rear driving axle assembly operatively connected with said frame assembly, said steering and said rear driving axle assemblies each being provided with a gear reduction mechanism, a pair of engine assemblies mounted on opposite sides of the main frame member of said frame assembly, power transmitting means connecting one of said engine assemblies with the gear reduction mechanism of said rear driving axle assembly, a power transmission assembly mounted on the main frame member of said frame assembly between said steering and said rear driving axle assemblies, a second power transmitting means connecting the other of said pair of engine assemblies with said power transmission assembly, and a third power transmitting means connecting said power transmission assembly with the gear reduction mechanism of said steering axle assembly.

13. In a vehicle, the combination of a main frame member extending longitudinally at the longitudinal center of the vehicle, a front driving axle connected with said main frame member, a rear driving axle connected with said main frame member, said driving axles each being provided with a reduction gear mechanism, a transfer transmission assembly supported adjacent said main frame member, a pair of engines, power transmitting means operatively connecting each of said engines with one only of said driving axles, each of said power transmitting means comprising a transmission assembly, one only of said power transmitting means being operatively connected with said transfer transmission assembly.

14. In a vehicle provided with a main frame member extending longitudinally at substantially the longitudinal center of the vehicle, the combination of a steering driving axle assembly, a second driving axle assembly, a pair of engine assemblies, and power transmission means comprising two transmissions mounted on said engine assemblies, said power transmission means further comprising a third transmission operatively connected between one of said engine assemblies and one of said driving axle assemblies, said third transmission being provided with means for attaching to said main frame member, said third transmission comprising a transfer mechanism for transmitting driving torque from said one of said engine assemblies to said one of said driving axle assemblies.

15. In a vehicle, the combination of a steering driving axle assembly, a second driving axle assembly, a pair of engine assemblies having their front ends adjacent one another, said engine assemblies being located adjacent said steering driving axle assembly, and power transmission means operatively connecting each of said engine assemblies with one only of said driving axle assemblies, the power transmission means connecting one of said engine assemblies with one of said driving axle assemblies comprising a single unit transmission operatively connected with one of said engine assemblies and one of said driving axle assemblies to drive said one of said driving axle assemblies, the power transmission means connecting the other of said engine assemblies with the other of said driving axle assemblies comprising a pair of transmission units operatively connected with said other of said engine assemblies and said other of said driving axle assemblies to drive said other of said driving axle assemblies, one of said pair of transmission units comprising a transfer mechanism for transmitting driving torque from said other of said engine assemblies to said other of said driving axle assemblies.

HUGH JOSEPH DILLON.